Figure 1:
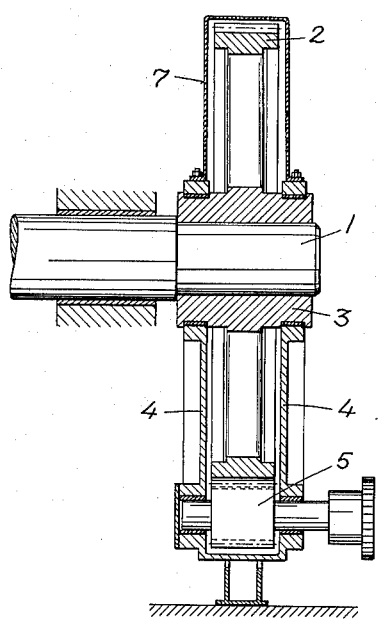

March 22, 1966  O. PÜHRINGER  3,241,387

SINGLE-STAGED SPUR GEAR UNIT

Filed Sept. 13, 1962

INVENTOR
OTHMAR PÜHRINGER
BY

HIS ATTORNEYS

United States Patent Office 3,241,387
Patented Mar. 22, 1966

3,241,387
SINGLE-STAGED SPUR GEAR UNIT
Othmar Pühringer, Linz, Austria, assignor to Vereinigte Osterreichische Eisen- und Stahlwerke Aktiengesellschaft, Linz, Austria, a company of Austria
Filed Sept. 13, 1962, Ser. No. 223,435
Claims priority, application Austria, Sept. 22, 1961,
A 7,168/61
3 Claims. (Cl. 74—411)

This invention relates to a single-stage spur gear unit having a large transmission ratio and intended for heavy loads.

In the production of steel from crude iron by refining with oxygen or air, converters or crucibles are used which are provided with a refractory lining. These refining vessels are inserted in trunnion rings having two trunnions. By means of a drive acting on the trunnions, these refining vessels must be tiltable from the blowing position to the discharging position.

In known designs of the tilting drive of such metallurgical furnaces, a large gear is keyed onto a trunnion and is driven by a pinion. It is a desire of the designers to arrange the crucible drive means below the working platform.

It has already been proposed to mount the pinion for driving the gear separately on the steel structure of an intermediate platform. In this case, however, the toothed mesh depends on the accuracy of the assembly on the site and is adversely affected by a distortion or displacement of the trunnion ring. It was not possible with these known designs to ensure an exact distance between centers and the side faces of the teeth were not fully in engagement.

In order to eliminate these disadvantages, it has already been proposed to mount the pinion in a rocker rolling on a track which is concentric with the gear. This arrangement has also failed to give satisfactory results and has the following disadvantages: The complicated rocker design with unilaterally supported rollers involves a substantial increase in expenditure, which is economically undesirable; the track for the rocker must necessarily be large in diameter. As a result, the design is highly susceptible to the entrance of dirt and must be sealed with special care. The heavy worm gearing rigidly coupled directly to the pinion is unilaterally carried by the pinion shaft and must be resiliently supported. Whereas this support takes up the weight of the gearing when the drive is standing still, a relief is afforded during operation by the pressure at the teeth; this may result in uncontrolled movements of the entire gear unit.

The present invention has as its object to avoid these disadvantages and difficulties. It resides in that in a spur gear unit the pinion thereof is mounted in a pinion carrier so as to be capable of a pendulum movement about the driven shaft.

The pinion carrier has suitably a plain bearing surrounding the driven shaft; this plain bearing may consist of one part or a plurality of parts.

The pinion carrier is preferably supported at the center of the gear unit at right angles to the axis of the pinion. The support may be provided by two supporting pins, which are provided on both sides of the pinion carrier and preferably inclined relative to the horizontal plane.

The invention will be explained more in detail with reference to the accompanying drawing which shows illustrative embodiment.

Figure 2:
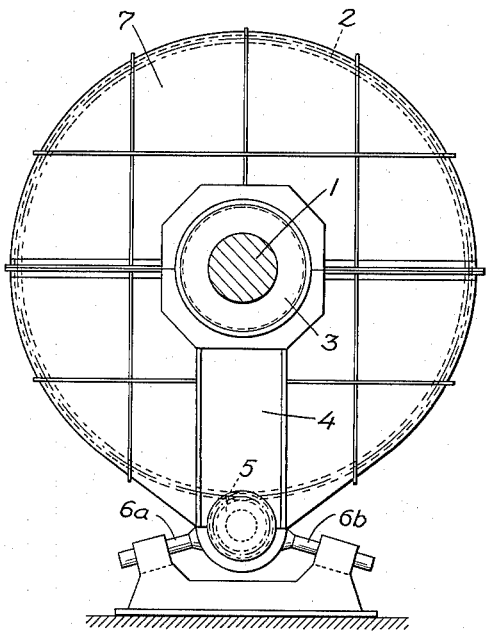

FIG. 1 is a vertical sectional view and FIG. 2 an elevation showing the gear unit according to the invention.

In FIG. 1, the driven shaft 1 (here a trunnion of a metallurgical refining vessel) has keyed thereto a large gear 2, the hub 3 of which is connected to two pinion carriers 4. The pinion carriers comprise a narrow plain bearing, which surrounds the hub or trunnion. The pinion 5 is mounted at the other end of the pinion carriers, which revolves on the pitch circle and is suspended so as to be movable like a pendulum about the driven shaft 1.

At the center of the gear unit, the pinion bearings are supported at right angles to the axis of the pinion by supporting pins 6a and 6b on both sides to take up the reaction pressure. As is apparent from FIG. 2, the supporting pins are inclined relative to the horizontal to prevent an elongation of the pinion carrier by expanding forces exerted by the teeth.

The gear and pinion are enclosed by a lightweight sheet metal housing 7 screwed to the pinion carrier. In this way, the gear unit is entirely enclosed and protected against an access of dirt.

The design according to the invention has the following advantages:

The entire carrying gear structure consists only of the pinion carriers, which can be perfectly machined to high precision;

the center distance between the gear and the pinion is exactly determined and independent of the assembling work;

the support at the center of the gear unit ensures a uniform transmission of force throughout the width of the tooth;

the design lends itself to an easy and exact calculation because it is statically determinate;

if the trunnion is displaced, due to inaccurate assembly or during operation, a disturbing effect on the toothed mesh is avoided because the entire gear unit can follow the displacement;

the gear unit is protected against an access of dirt; it can easily be sealed and for this reason can easily be lubricated;

the gear unit has a small width and is entirely symmetrical; the design is simple and inexpensive.

In a preferred embodiment, a pressure gauge, e.g., in the form of a box, may be incorporated in the support so that the driving momentum can be measured. The indication of pressure may be used for supervising purposes and to prevent overloading.

What I claim is:

1. A single stage gear unit having a high transmission ratio for driving and tilting metallurgical furnaces, comprising a drive shaft, a trunnion connected to and supporting said furnace, a large gear mounted on and fixed to said trunnion, a pinion carrier having a pair of arms disposed on opposite sides of said large gear, means on said trunnion rotatably supporting one end of each of said arms, said drive shaft being rotatably mounted in the opposite ends of both of said arms and being supported thereby, a small pinion fixed to said drive shaft between said arms and meshing with said large gear, and a pair of fixed supporting pins engaging said pinion carrier to resist deformation and displacement of said pinion carrier, said pins engaging the pinion carrier adjacent to and on opposite sides of said drive shaft and inclined to the plane of the axis of said drive shaft and trunnion and substantially perpendicular to said drive shaft.

2. A single stage gear unit having a high transmission ratio for driving and tilting metallurgical furnaces, comprising a drive shaft, a trunnion connected to and supporting said furnace, a large gear having a hub fixed to said trunnion, a pinion carrier having a pair of arms disposed on opposite sides of said large gear, bearing means on said hub and at one end of each of said arms supporting said pinion carrier for pendulum motion in relation to said large gear, said drive shaft being rotatably mounted in said pinion carrier adjacent to the opposite ends of said arms, a small pinion fixed to said drive shaft between said arms and meshing with said large gear, and oppositely inclined fixed pins engaging said pinion carrier adjacent to said drive shaft for opposing deformation and motion of said pinion carrier around said trunnion.

3. The gear unit set forth in claim 2 comprising a light weight housing enclosing said large gear and said pinion and secured to said pinion carrier.

References Cited by the Examiner

UNITED STATES PATENTS

| | | | |
|---|---|---|---|
| 1,659,544 | 2/1928 | Dodge | 74—526 X |
| 1,883,413 | 10/1932 | Schoenfeldt | 263—22 |
| 2,121,109 | 6/1938 | Weinheimer | 263—21 |
| 2,715,834 | 8/1955 | Chamberlin | 74—801 |
| 2,724,266 | 11/1955 | Baker et al. | 74—801 |
| 2,801,548 | 8/1957 | Bade | 74—421 |
| 3,000,229 | 9/1961 | Christian | 74—421 |

DON A. WAITE, *Primary Examiner.*

BROUGHTON G. DURHAM, *Examiner.*